United States Patent Office 3,435,292
Patented Mar. 25, 1969

3,435,292
ELECTRIC SHOCK CONTROL DEVICE
Arulanandasami Joseph Stephen and Sinnappa Adaikalam Arulanandasami, both of 35–C, Vathukara St., Tiruchirapalli 3, Madras State, India
Filed July 29, 1966, Ser. No. 568,930
Int. Cl. H02h 1/02, 3/14
U.S. Cl. 317—18    14 Claims

ABSTRACT OF THE DISCLOSURE

An electric shock control device includes an input circuit and a load circuit interconnected by normally closed relay operated contacts. The input circuit includes two primary windings in inductively coupled opposition to each other. A secondary winding is inductively coupled to the primary windings and has a current induced therein only upon an imbalance of the currents in the primary windings. A normally non-conductive amplifier has its input connected to the secondary winding and provides an output current only responsive to a current flow in the secondary winding. Normally deenergized contact operating relay means are connected to the output of the amplifier. Upon grounding of the load circuit, the currents in the primary windings are unbalanced and the amplifier energizes the relay means to open the normally closed contacts to disconnect the input circuit from the load circuit. Manually controlled means are provided to effect reclosing of the normally closed contacts.

---

This invention relates to an electric shock control device which, when used in conjunction with low tension alternating current mains such as are provided for residential and commercial buildings, industrial units and the like, effectively prevents the dangerous effects of electric shock from being felt when a live part of the circuit is grounded.

An object of this invention is to propose an electric shock control device which effectively prevents the dangerous effects of a shock.

A further object of this invention is to propose an electric shock control device having a high sensitivity.

Another object of this invention is to propose an electric shock control device having means for varying the sensitivity thereof.

A still further object of this invention is to propose an electric shock control device which is efficient, economical, cheap in original costs and simple to operate.

Another object of this invention is to propose an electric shock control device having means for disconnecting a load from the power source when said load circuit is grounded.

A further object of this invention is to propose an electric shock control device which eliminates the necessity of grounding the load.

The principle of operation of the electric shock control device according to this invention is to automatically cut off the supply of electric current to the load within a very small interval of time such that the current flowing through the body of an operator to ground will be restricted only to such an interval thereby preventing the harmful effects of shock from being felt, whereas in the conventional protective devices, attempts have been made to reduce the magnitude of the ground current flowing through the body to a low value. Thus this invention reduces the time factor to a negligibly small value whereas the conventional devices reduce only to some extent the magnitude of the ground current to a low value.

Figures 1, 2, 3:
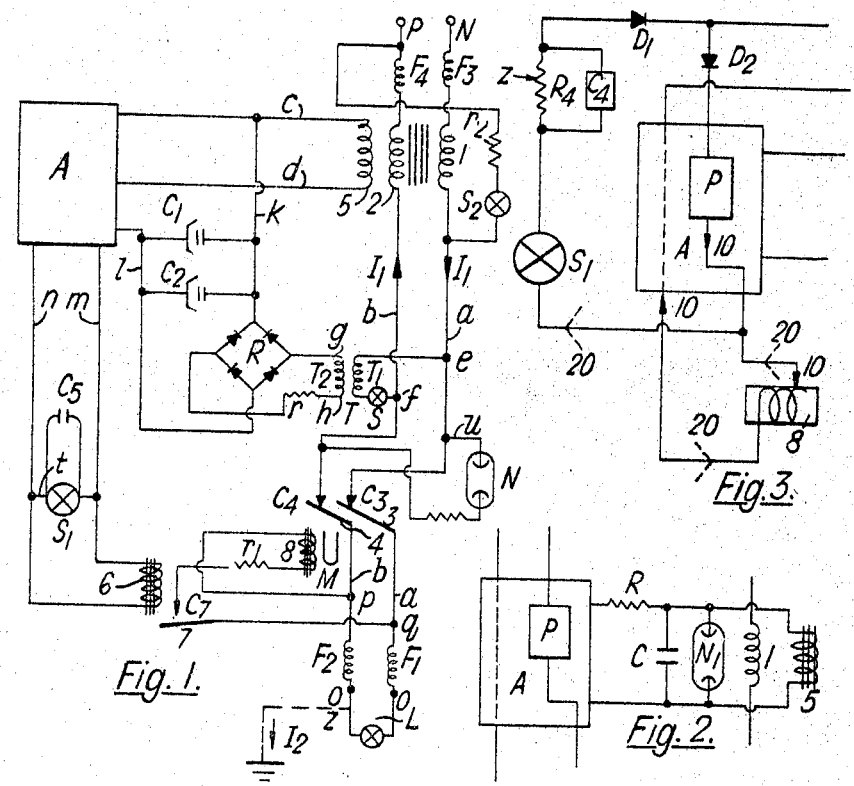
Figure 4:
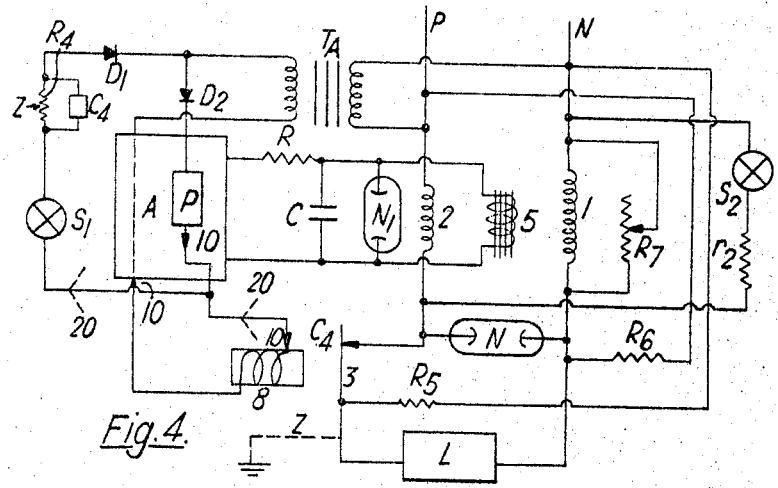

Further objects and advantages of this invention will be apparent when described with reference to the accompanying drawings, wherein FIG. 1 shows one embodiment of the circuit of the electric shock control device in accordance with the teachings of this invention. FIG. 2 shows another embodiment of the amplifier input circuit of the said device, FIG. 3 shows another embodiment of the control circuit of the said device and FIG. 4 shows a circuit incorporating the circuits of FIGS. 2 and 3.

Referring to FIG. 1 the electric shock control device is characterised by two magnetic coils 1 and 2 wound over a single iron core of high magnetic permeability and low retentivity, the said coils, hereinafter referred to as the main coils, being in opposition such that when an equal current in opposite directions passes through them, the resultant magnetic field produced by the two coils is practically zero. The said main coils are connected in series, between the phase P and neutral N of the A.C. supply mains and the load output terminals O, through two spring loaded arms 3 and 4, and four radio frequency chokes $F_1$, $F_2$, $F_3$ and $F_4$, by the supply lines $a$ and $b$. The said spring loaded arms, hereinafter referred to as the main arms, are normally kept in contact with two corresponding contacts $C_3$ and $C_4$ by virtue of the tension of their springs. The output terminals are connected to the load which is indicated by L. The radio frequency chokes $F_1$ and $F_2$ as well as $F_3$ and $F_4$ are provided to reduce the disturbances caused by arcing and to damp other undesirable effects.

A permanent magnet M is placed in close proximity to the main arms 3 and 4, so as just not to affect the said main arms by its field, unless the said main arms are drawn within the range of said field by another field, as hereinafter described.

Another coil 5, hereinafter referred to as the input coil is wound over the aforesaid two main coils, 1 and 2, the leads $c$ and $d$ of the said input coil being connected to the input side of an amplifier unit represented by A. The amplifier unit may consist of the necessary number of amplification stages and sensitivity. The power supply to the said amplifier unit is tapped from the supply lines $a$ and $b$ of the main coils at points $e$ and $f$, such as between the said main coils and the main arms, by means of connecting the primary $T_1$ of a stepdown transformer T through a switch $s$ at the points $e$ and $f$ aforementioned, the said switch being referred to hereinafter as the transformer-switch. The secondary $T_2$ of the said power transformer T is taken to a full wave rectifier or like device, indicated by R, through a resistor $r$ by the lines $g$ and $h$, the output leads $k$ and $l$ of rectifier R being taken to the amplifier unit. Smoothing capacitors $C_1$ and $C_2$ are connected in parallel between the output leads of rectifier R. The resistor $r$ is to protect the rectifier R from any currents higher than rated.

The output leads $m$, $n$ of the amplifier unit A are connected to a relay coil 6, hereinafter referred to as the relay coil of the auxiliary arm, which is wound on a soft iron core of high magnetic permeability and low retentivity, said relay coil being placed in close proximity to a spring-loaded arm 7, hereinafter referred to as the auxiliary arm, the tension of its spring normally tending to keep the said auxiliary arm away from a corresponding terminal $C_7$. The terminal $C_7$ is connected through a resistor $r_1$ and another relay coil 8, hereinafter referred to as the relay coil of the main arms, to a point $p$ on the supply line $b$ from neutral, said point $p$ being situated between the main arms and the load output terminals O. The resistor $r_1$ is to protect the relay coil 8 from the effects of a higher than rated current, the said relay coil being also wound on an iron core of high magnetic permeability and low retentivity.

One end of the auxiliary arm 7 is connected to the supply line $a$ from phase at the point $q$. The relay coil 8 of the main arms is placed in close proximity to said main arms.

A push-button spring loaded switch $s_1$ hereinafter refered to as the first switch, is shunted between the output leads, $m$, $n$ of the amplifier unit A between components A and 8 by the line $t$. A capacitor $C_5$ is paralleled onto the said switch. The said switch is adapted to complete or open the shunt line $t$ when the push-button is pressed or released respectively. The purpose of this switch will be explained below.

Another push-button spring loaded switch $s_2$, hereinafter referred to as the second switch, is connected to a resistance $r_2$ in series, the series combination of said switch and resistor being paralleled onto the supply lines $a$, $b$ as shown in FIG. 1, such that when the push-button of said switch is pressed the switch is closed and a part of the current from one of the supply lines is by-passed through the switch and passes back to the mains supply thereby disturbing the balance of equal currents flowing through the main coils 1 and 2. The reasons for this will be explained below. When the push-button of said switch is released, the switch is opened.

A neon lamp N is shunted between the supply lines $a$, $b$ at points $u$, $v$ after the main coils and before the main arms.

The manner in which the electric shock control device according to this invention operates will now be described:

Assuming that the supply mains are energized, and so also the transformer switch $s$, a steady alternating current flows to the load L and back through the supply lines $a$ and $b$ and therefore through the corresponding contacts $C_3$ and $C_4$ of the main arms and the main arms 3 and 4, which are held against the said contacts by spring tension. The current flowing to load through one of the supply lines $a$ or $b$ and the return current through the other line $b$ or $a$ being equal, the resultant magnetic field of the main coils will be zero.

This current is represented by $I_1$ and flows through the radio frequency chokes $F_1$, $F_2$ (provided in the supply lines $a$ and $b$) before the load output terminals O, as well as the chokes $F_3$ and $F_4$ said chokes serving to reduce any electrical interference caused by arcing in the supply mains or elsewhere.

Assuming now, as shown in FIG. 1, by the dotted line Z, a point in the load circuit is grounded due to contact of any part of the body of a living creature, a ground current $I_2$ is caused to flow to earth such that a return current from load passing through one of the main coils back to the supply mains will not be the same as the current leaving the supply mains and flowing through the other main coil to load.

This difference in current value of the currents now flowing through the main coils sets up a resultant alternating magnetic field which induces an alternating E.M.F. in the input coil 5, the said alternating E.M.F. being impressed now on the input of the amplifier unit A. As already stated the transformer switch $s$ being on, the necessary voltage for the proper functioning of the amplifier unit is supplied through the stepdown transformer T and the full wave rectifier R which feeds direct current to the amplifier unit. The resulting amplified current now flows from the amplifier output leads $m$, $n$ through the relay coil 6, of the auxiliary arm, energising it, to draw the auxiliary arm 7 towards it to contact the corresponding terminal $C_7$ to complete the circuit of the relay coil 8 of the main arms such that a current now is made to flow from the supply lines $a$ and $b$ through 8, thereby energising it.

The energised relay coil 8 of the main arm thus draws the main arms 3 and 4 towards it thereby making the said arms break contact at their corresponding contacts $C_3$ and $C_4$, thus cutting off the A.C. supply to load by opening the supply lines $a$ and $b$.

The main arms now are within the influence of the permanent magnetic field of M such that they are prevented from re-establishing contact with their respective contacts $C_3$ and $C_4$.

The cutting off of supply by the above sequence of operations takes place in a very small interval of time so that the ground current $I_2$ flowing through the operator is only for such interval and since, when the supply is cut off, the ground current simultaneously ceases to flow through the said operator, the deleterious effects of electric shock are prevented from being felt.

It shall also be observed that when the supply to load is cut off in the above manner, the relay coils 6 and 8 of the auxiliary arm and main arms respectively are de-energised, since in the one case the input coil 5 ceases to have any induced E.M.F. in it for the necessary current to flow to the amplifier unit to be amplified and fed to the relay coils of the auxiliary arm; and since in the other case the supply lines $a$ and $b$ carry no current by virtue of the break in their circuit at the points of the contacts $C_3$ and $C_4$. Consequently, the auxiliary arm 7 reverts back to its initial portion away from the corresponding terminal $C_7$ although as already explained, the main arms are held in the attracted position by the field of permanent magnet M.

To enable the supply to load L to be resumed, an insulated spring-loaded push-rod arrangement (not illustrated), to which is attached a push-button, is provided. The said push-rod is operated by pressing the push-button provided therefor and is adapted to push the main arms 3 and 4 away from the field of M to enable them to revert back to their original positions in contact with their corresponding contacts $C_3$ and $C_4$ and to be maintained there by the tension of their springs. When the push-button is released, the push-rod reverts back to rest.

It is sometimes found that the use of the push-rod arrangement as detailed above causes arcing and this arcing affects the relay coil 6 of the auxiliary arm. To overcome this, before the push-button relating to the push-rod is pressed, the first switch $s_1$ is closed thereby completing the shunt line $t$. The push-rod is then operated. The capacitor $C_5$ is of a very low capacitance to enable high frequency currents produced by arcing to pass through it, lower frequency currents passing through the shunt line $t$. The switch $s_1$ is opened after the push-rod is operated.

Assuming the supply to load is established, the balance of equal currents $I_1$ through the main coils 1 and 2 is maintained. When the switch $s_2$ is now closed for a short interval of time and then opened the balance is disturbed due to a part of the current from one of the supply lines passing through the said switch and resistor $r_2$. As already explained this imbalance causes a resultant magnetic field to be set up by the main coils 1 and 2. It will be observed that by this the effect of the load circuit becoming grounded is simulated. Consequently the resultant magnetic field induces an alternating E.M.F. in the input coil 5 giving rise to the sequence of operations above mentioned to result in the main arms cutting off the supply to the load circuit. It is thus ascertained that the circuit is in proper working condition. The resistor $r_2$ is of predetermined value to simulate as far as possible the conditions of imbalance produced by actual grounding of the load circuit and also to restrict the value of the current through the second switch to the desired value.

The supply to load can then be resumed by operating the push-rod and the first switch as already stated.

Reference is now made to FIGS. 2–4 and wherein like numerals denote similar parts as illustrated in FIG. 1. For the sake of brevity FIGS. 2–4 are described only with regard to the modifications effected in the circuit.

In the circuit of FIG. 2 the radio frequency chokes $F_1$, $F_2$, $F_3$, and $F_4$ shown in FIG. 1 are replaced by a filter circuit provided in the input signal terminals of the amplifier A. The filter circuit functions in a manner similar to that described with regard to the radio frequency chokes $F_1$, $F_2$, $F_3$ and $F_4$, namely to dampen undesirable effects. Any suitable filter circuit may be used within the scope of this invention and for the purpose of illustration we have provided an RC Filter circuit. The resistor R is connected in series with the amplifier whereas the capacitor C is connected across the said amplifier A.

Further, in the circuit of FIG. 2, we have provided a neon cartridge $N_1$ connected across the input terminals of the amplifier A. When the phase line is grounded directly, a high voltage would be fed to the input of the amplifier. In order to prevent the high voltage from being fed to the amplifier and which would have a detrimental effect, the neon cartridge $N_1$ is connected across the input signal terminals of the amplifier. Since the neon cartridge N offers a path of low resistance, the voltage is impressed upon the neon cartridge $N_1$ and which thereby substantially prevents the excessive high voltage from reaching the amplifier. However, it would be appreciated that the signal necessary to operate the amplifier still reaches the amplifier A and it is only the excessive high voltage which is discharged through the neon cartridge.

The control circuit of FIG. 3 comprises of a single relay connected to the amplifier A. When a signal is not impressed upon the amplifier A, there is an infinite resistance and hence there is no current output from the amplifier, which thus prevents the relay from being energized. Considering that a signal is impressed upon the amplifier A, the output current of the amplifier is denoted by the path 10. Due to the output current of the amplifier the relay 6 is energized and thus disconnects the load circuit from the input circuit.

In order that the relay 6 may be de-energized restoring thereby the arm of the relay to its normal operative position, a switch $S_1$ is provided with said amplifier A. An RC circuit Z is provided with said switch $S_1$ said network being connected to a first rectifier $D_1$ and to a second rectifier $D_2$. In the normal operative position of the apparatus, switch $S_1$ is kept open. However, when the arm of the relay is to be restored to its original position and for which the demagnetization is required, the switch $S_1$ is pressed and the current flows in the path indicated by the arrow 20.

Referring now to FIG. 4, we have incorporated the circuits of FIGS. 2 and 3. However, it is to be understood that the amplifier input circuit of FIG. 2 and the control circuit of FIG. 3 can be also used in the circuit of FIG. 1. Further in the input circuit, we have provided a variable resistor $R_7$ connected in parallel to the coil 1. The variable resistor $R_7$ is provided in order to compensate the high induction of any one of the coils in the event of there being a manufacturing error in the coil. Though we have illustrated the variable resistor $R_7$ as connected across the induction coil 1, it may be understood that the resistor $R_7$ may alternatively be connected across coil 2, if said coil is found to have a higher induction. It is necessary that the variable resistor should be connected across that coil which has a higher induction, said resistor thereby providing an additional path for the current.

In order to ensure the working of the relay 8, a resistor $R_5$ is connected from the neutral line of the input circuit to the phase line of the load circuit, and a resistor $R_6$ is connected from the phase line of the input circuit to the neutral line of the load circuit. It would be appreciated that the Resistors $R_5$ and $R_6$ may conveniently, be replaced by condensers of equal value. In FIG. 4 we have shown a single contact arm 3. However, in the circuit of FIG. 1 wherein two arms 3 and 4 are provided, the resistor $R_6$ may be conveniently connected from the phase line to the neutral line of the input circuit whereas the resistor $R_5$ is connected in the same manner as indicated in FIG. 4. The Resistors $R_5$ and $R_6$ should be of equal value.

We claim:
1. An electric shock control device comprising, in combination, a pair of input terminals for connection to a source of electric potential; an input circuit connected to said input terminals and including a pair of input conductors; two primary windings, each connected in series in a respective input conductor, inductively coupled in opposition to each other in a manner such that, when the same current flows through both primary windings, the inductances thereof cancel each other; a secondary winding inductively coupled to said primary windings and having a current induced therein only upon an imbalance of the currents in said primary windings; a normally non-conductive amplifier having its input connected across said secondary winding and providing an output current only responsive to current flow within said secondary winding; circuit means connected to said input circuit and said amplifier and supplying an operating potential to said amplifier; a pair of load terminals; a load connected across said load terminals; a load circuit including a pair of load conductors connected to said load terminals; normally deenergized relay means connected to the output of said amplifier and including normally closed contact means connecting said input conductors in series with said load conductors for flow of current in series through said load and in series opposition through said primary windings; the currents flowing through said primary windings becoming unbalanced responsive to grounding of said load circuit whereby a current is induced in said secondary winding to render said amplifier conductive to produce an output current energizing said relay means to open said contact means to interrupt current flow from said input circuit to said load circuit; and resetting means, including a manually actuated element, operatively associated with said relay means and selectively operable to reclose said contact means.

2. An electric shock control device, as claimed in claim 1, in which said source of electric potential is a source of AC potential; said circuit means including rectifier means and said amplifier having a direct current output.

3. An electric shock control device, as claimed in claim 1, in which said amplifier output is a direct current flowing in one direction through said relay means; said resetting means including a resetting circuit coupled to said input circuit and connected to said relay means; said resetting circuit including, in series, a rectifier and a manually actuated element, and directing a current flow through said relay means in a direction opposite to the current flow of the amplifier output therethrough, to demagnetize said relay means to reclose said contact means.

4. An electric shock control device, as claimed in claim 3, in which said resetting circuit includes means limiting the magnetization reversing current therein.

5. An electric shock control device, as claimed in claim 4, in which said limiting means comprises an impedance connected in series with said rectifier.

6. An electric shock control device, as claimed in claim 1, including means providing a low resistance shunt across the input of said amplifier and limiting the voltage applied to the input of said amplifier.

7. An electric shock control device, as claimed in claim 6, wherein said low resistance shunt comprises a glow discharge lamp.

8. An electric shock control device, as claimed in claim 1, including a low pass filter circuit connected across the input of said amplifier.

9. An electric shock control device, as claimed in claim 1, including balancing means connected in said input circuit in operative relation with said primary windings and operable to balance said primary windings to compensate any difference in the inductances thereof.

10. An electric shock control device, as claimed in claim 9, in which said balancing means comprises a variable resistor connected in parallel with the primary winding having the higher induction and providing a shunt current flow path in parallel with the latter.

11. An electric shock control device, as claimed in claim 1, in which said input circuit includes circuit testing means; said circuit testing means comprising a resistance and a normally open switch connected in series with said resistance, the combination of said resistance and said normally open switch being connected in shunt relation with one of said primary windings; whereby, upon closing of said normally open switch, the current flows through said primary windings are unbalanced to effect operation of said relay means.

12. An electric shock control device, as claimed in claim 1, wherein said relay means comprises a first relay connected to the output of said amplifier and including a first relay operating coil and a contact controlling armature normally spring biased to the contact opening position; said relay means further including a second relay including a second relay operating coil and at least one relay armature operated thereby and constituting said normally closed contact means; said spring biased armature being connected in the energizing circuit of said second relay operating coil; whereby, upon imbalance of the currents in said primary windings, said first relay operating coil is energized to close the contacts controlled by said spring biased armature to energize said second relay operating coil to open said normally closed contacts.

13. An electric shock control device, as claimed in claim 12, wherein said second relay includes a permanent magnet positioned so that said second armature is outside the magnetic field of said permanent magnet in the closed position of said normally closed contacts; said permanent magnet acting on said second armature in the opened position of said normally closed contacts to maintain said normally closed contacts opened.

14. An electric shock control device, as claimed in claim 12, including a normally open switch connected across the operating coil of said first relay; and a capacitor connected across said normally open switch; said normally open switch being closed only during operation of said resetting means.

References Cited

UNITED STATES PATENTS

| 3,213,321 | 10/1965 | Dalziel | 317—18 |
| 3,252,052 | 5/1966 | Nash | 317—18 |
| 3,296,493 | 1/1967 | Whittaker et al. | 317—18 |
| 3,353,065 | 11/1967 | Bassani | 317—27 |

JOHN F. COUCH, *Primary Examiner.*

J. D. TRAMMELL, *Assistant Examiner.*

U.S. Cl. X.R.

317—27